(12) United States Patent  
Austin

(10) Patent No.: US 9,896,141 B2  
(45) Date of Patent: Feb. 20, 2018

(54) BIKESEATBOOST POWER SEAT, FITS ALL BICYCLES

(71) Applicant: Robert Austin, Landrum, SC (US)

(72) Inventor: Robert Austin, Landrum, SC (US)

(73) Assignee: Robert Austin, Landrum, SC (US)

( * ) Notice: Subject to any disclaimer, the term of this patent is extended or adjusted under 35 U.S.C. 154(b) by 53 days.

(21) Appl. No.: 14/998,942

(22) Filed: Mar. 8, 2016

(65) Prior Publication Data

US 2017/0259864 A1 Sep. 14, 2017

(51) Int. Cl.  
*B62J 1/08* (2006.01)

(52) U.S. Cl.  
CPC ............ *B62J 1/08* (2013.01); *B62J 2001/085* (2013.01)

(58) Field of Classification Search  
CPC .............................. B62J 1/08; B62J 2001/085  
See application file for complete search history.

(56) References Cited

U.S. PATENT DOCUMENTS

| | | | | |
|---|---|---|---|---|
| 2,714,001 A * | 7/1955 | Hersey | ................ | B60G 99/006 108/136 |
| 3,314,672 A * | 4/1967 | Persson | ................ | B60N 2/502 248/575 |
| 5,489,139 A * | 2/1996 | McFarland | .............. | B62J 1/065 248/586 |
| 5,833,255 A * | 11/1998 | Sarder | ........................ | B62J 1/06 280/220 |
| 5,915,675 A * | 6/1999 | Chen | ......................... | B62J 1/02 267/132 |
| 6,089,656 A * | 7/2000 | Hals | ........................ | B62J 1/065 297/195.1 |
| 6,270,065 B1 * | 8/2001 | Hals | ........................ | B62J 1/04 267/132 |
| 6,409,130 B1 * | 6/2002 | Maret | ....................... | B62J 1/08 248/219.2 |
| 8,888,117 B2 * | 11/2014 | Barkley | ................... | B62J 1/065 280/283 |
| 9,663,167 B2 * | 5/2017 | Fagnan | ..................... | B62J 1/08 |
| 2016/0075389 A1 * | 3/2016 | Ahnert | ..................... | B62J 1/065 297/311 |

* cited by examiner

*Primary Examiner* — Joseph M Rocca  
*Assistant Examiner* — Michael R Stabley

(57) ABSTRACT

An assembly is provided that is used to allow a bicycle to have seat height adjustment controlled by the rider while the bicycle is in motion. The seat height is adjustable to suit the needs of the operator. The assembly can include a horizontal lower channel which can be attached to a seat-post or seat-clamp of a bicycle and a horizontal upper channel that can be secured to a bicycle seat. The horizontal upper channel can be attached to the lower channel by four arms and can be raised and lowered by a control.

16 Claims, 4 Drawing Sheets

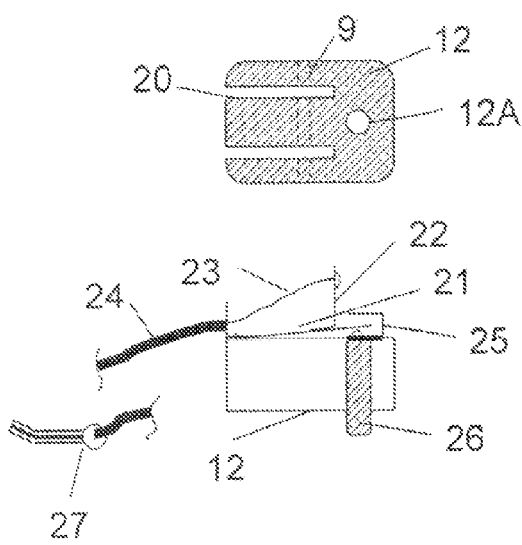
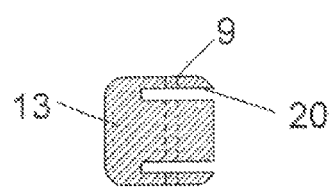
FIG. 7
FIG. 8

BIKESEATBOOST POWER SEAT, FITS ALL BICYCLES

RELATED APPLICATION

This non-provisional utility patent application claims priority from U.S. provisional patent application number 62/130,686, filing date Mar. 10, 2015, titled BIKEBOOST POWER SEAT, FITS ALL BICYCLES.

TECHNICAL FIELD

The present invention relates to devices which allow a seat or saddle height of bicycle seats to be easily adjusted while the bicycle is in motion (or rest) using a handlebar mounted control such as a lever or pushbutton. The present invention mounts on any bicycles seat-post/seat-clamp combination. The owner's bicycle seat or any other bicycle seat is attached to top portion of the device.

BACKGROUND

Nearly all bicycles have a seat post whose height may be adjusted manually while the bike is parked by loosening a bolt and nut combination. Bicycles may also be equipped with a special elevating seat post which replaces the user's seat post. These posts are based on locking gas springs and are very expensive, and have a low weight capacity and adjustment range.

SUMMARY

The device is a self contained bicycle seat elevating/lowering device which mounts on any bicycles existing seat post and seat clamp assembly and allows the rider to adjust seat height while riding (in motion). The owner's bicycle seat, or any bicycle seat, may be mounted to the upper portion of the unit. In addition, a special low profile seat may be mounted which hides the unit when it is in the lowered position.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

(FIGS. 3 through 8 will not show these rails and clamp components mounting exterior to the lower and upper channel components.)

FIG. 3 is an illustration of a side view of the components located within the side of the assembly according to FIG. 1 while the assembly is in the fully lowered position.

FIG. 4 is an illustration of the bottom view of the lower portion of the assembly according to FIG. 1 showing locking holes and opening for the control cable to exit.

FIG. 5 is an illustration a side view of the components within the side of the assembly according to FIG. 1 while the assembly is in a raised position.

FIG. 6 is an illustration of the back side view of the assembly according to FIG. 1 while in a raised position showing the torsion spring, arms, upper sliding block, spacers and axles.

FIG. 7 is an illustration of a top view of the lower sliding block and a side view of the lower sliding block with locking pin and control cable components of the assembly according to FIG. 1.

FIG. 8 is an illustration of a top view of the upper sliding block of the assembly according to FIG. 1.

DETAILED DESCRIPTION

Figure 1:
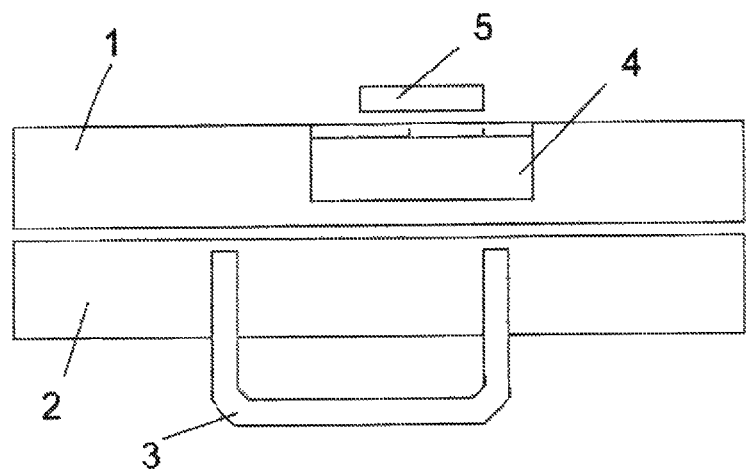
FIG. 1 is an illustration of a side view of an assembly for lowering and elevating a bicycle seat including the rails for mounting to a seat post clamp on the lower channel, and, on the upper channel, the clamp components used to mount a bicycle seat.
Figure 2:
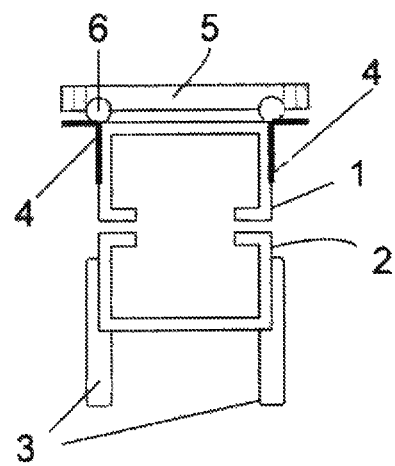
FIG. 2 is an illustration of a front or back side view of the assembly according to FIG. 1 showing the lower and upper channels, the rails and the clamp components.
Figure 3:
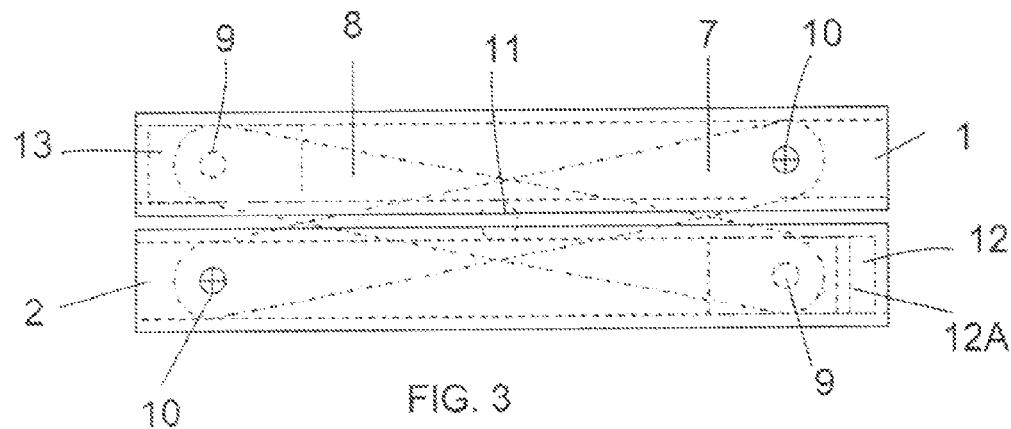

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. It is to be understood by one of ordinary skill in the art that the present discussion is a description of exemplary embodiments only, and is not intended as limiting the broader aspects of the present subject matter, which broader aspects are embodied in exemplary constructions.

Referring to FIGS. 1-8, the device, or assembly, has an upper channel 1 and a lower channel 2. The channels (or frames) are "U" type channels with a small lip to captivate upper sliding block 13 and lower sliding block 12 (see FIGS. 3 and 5). The lower channel 2 has welded to it two round steel rails 3. These rails 3 mimic a bicycle seats rails in diameter and spacing. This allows the lower channel 2 to mount to any bicycles seat-post/seat-clamp assembly. The upper channel 1 has welded to it two steel angles 4 with three (3) holes in each angle 4. The center holes in the angle 4 are used to captivate any bicycle seat rails 6 (see FIG. 2) by inserting two screws into the captivating plate 5.

The interior components include two outside arms 7. These arms 7 rotate about axles 10 with each axle 10 fixed to the upper and lower channels 1, 2 by screw or rivet. There are two interior arms 8 which are attached to an upper sliding block 13 and a lower sliding block 12, sliding blocks are located opposite each other or opposed. The sliding blocks 12, 13 each includes slots 20 (see FIGS. 7 and 8) into which the inside arms 8 locate and is captivated by an axle 9 which can be simply pushed into the sliding blocks. The inside arms 8 rotate on the axles 9 as the unit, or assembly, is raised and lowered. All four arms, outside arms 7 and inside arms 8, ride on a common center axle 11 and may rotate on the center axle 11 as the assembly is raised and lowered. The center axle 11 is captivated by a low profile head screw 17 or rivet (see FIG. 6). The lower sliding block 12 incorporates a centered round hole 12A (see FIGS. 3, 5, and 7) into which a locking pin 26 is installed. The locking pin 26 locates within one of the lower channels height positioning holes 15 of the lower channel 2 (see FIG. 4) unless it is raised by operator activation of the control lever 27 (see FIG. 7) mounted on the bicycle handlebar.

As the device is raised, the upper channel 1 moves away from the lower channel 2. As this occurs the upper and lower sliding blocks, 12 and 13, slide inward within their respective channels and the upper channel 1 moves backward (note that the lower sliding block 12 is the front of the assembly).

This backward movement mimics most bicycles' seat post which move the seat backward as the seat is raised.

Figure 6:
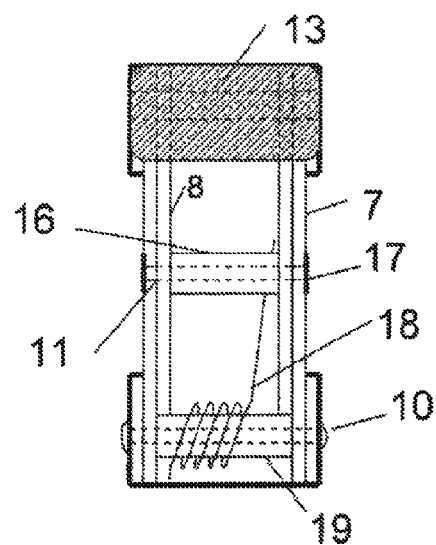

Referring to FIG. 6, the fixed outside arms 7 utilize spacers 19 on the axles 10 to maintain the position of the arms 7 within the assembly. Small spacers (not shown) may be located between the outside arms 7 and the sides of the upper and lower channel 1, 2. The outside arm spacer 19 of the lower channel 2 has installed around it a torsion spring 18. The torsion spring 18 arms are located between the lower channel 2 and the center axle 11. The torsion spring arm 18 rides on a spacer 16 on the center axle 11 located between all four (4) arms, and exerts pressure on this spacer 16 continually trying to raise the upper channel 1 away from the lower channel 2.

Figure 4:
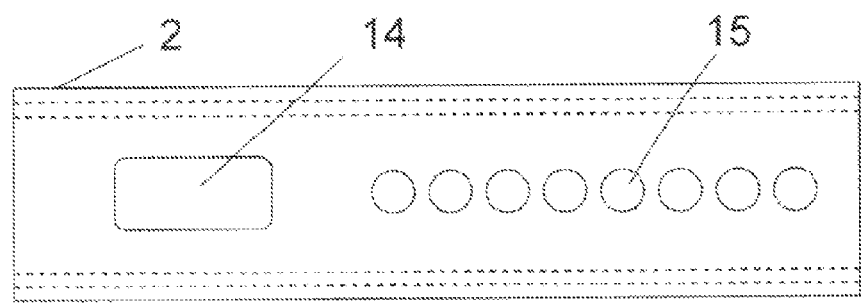
Figure 5:
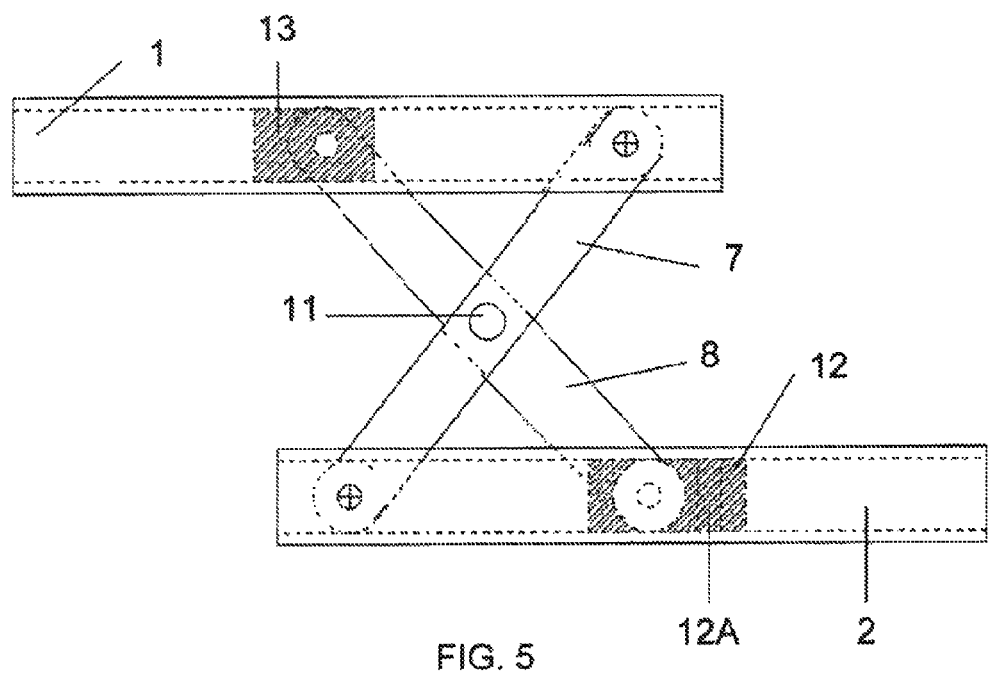

As shown in FIG. 4, the lower channel 2 of the assembly can have an opening 14 for receiving a control cable 24 of a control lever 27 (see FIG. 7) and can have locking holes 15. The lower sliding block 12, hardened steel locking pin 26 and other components allow the lower sliding block 12 to be either moved freely or locked in one of multiple positions with the locking pin 26 engaging one of the locking holes 15 in the lower channel 2 as explained below. This feature allows the seat height to be adjusted to individual needs.

A flat spring 21 is attached to the sliding block 12. Attached to the flat spring is an arm to which is attached a moveable inner core wire 23 of the control cables 24. When the inner core wire 23 is pulled by the control lever 27 the flat spring 21 raises and contacts the bracket 25 attached to the locking pin 26. This action raises the pin 26 freeing it from the captivating holes 15 in the bottom of the lower channel 2 allowing the torsion spring 18 to push upward moving the upper channel 1 away from the lower channel 2 to provide seat height adjustment. When the control lever 27 is released the flat spring 21 returns to its normal position, wherein it pushes the locking pin 26 downward such that the pin 26 comes to rest in one of the locking holes 15.

Thereby, according to the disclosure herein, a self contained elevating/lowering assembly for a bicycle seat is provided that comprises a horizontal lower member or channel which attaches directly to different types of existing bicycles seat-post/seat-camp types and a horizontal upper channel which is attached to the lower channel by four (4) arms. The horizontal upper channel can be attached to a variety of existing bicycle seats. Two arms of the four arms can be fixed to the lower and upper channel at opposite sides and can be connected to each other by common axles. Two arms of the four arms can be attached to lower and upper sliding low friction blocks which may move horizontally within the respective lower and upper channels and are captivated to the upper and lower channel by ears on both sides of the channel. The four arms can be connected at their midpoints at an "X" intersection by a common center axle such that the four arms form an "X" shape which may flatten or extend vertically. The elevating/lowering assembly can also comprise a torsion spring which provides constant pressure on the four arms at the "X" intersection to lift the upper channel away from the lower channel. The lower channel sliding block can incorporate a vertical steel locking pin and the lower channel can have multiple holes therein into which the locking pin may be inserted or removed to provide adjustable seat height. The elevating/lowering assembly can comprise a flat spring which forces the locking pin into the locking holes in the channel. Further, elevating/lowering assembly can comprise a control with a handlebar mounted pull lever and a cable, such as a Bowden cable, that is attached to the flat spring which when activated pulls the locking pin up and out of locking holes in the lower channel allowing the torsion spring to raise the upper channel. When the pull lever is released, the control cable can relax to allow the flat spring to push the locking pin down into a locking hole of the locking holes of the lower channel.

In some embodiments, the bicycle seat may be adjusted up or down while the bicycle is in motion using the handlebar mounted control lever or pushbutton located nearby the handlebar grips. In some embodiments, the lower and upper sliding blocks are opposed so that both sliding blocks move inward to move the upper channel, and bicycle seat, both upward and backward as the seat is raised. In some embodiments, the sliding bocks may not be opposed wherein the upper channel remains in the same plain as the lower channel as the seat is raised and lowered. In some embodiments, a memory plug may be inserted into the lower channel locking holes allowing the seat to rise to an operator's desired height. In some embodiments, body weight is removed or added in order to raise or lower the bicycle seat. In some embodiments, the assembly's lower channel appears as a bicycle seat to the bicycles existing seat-post/seat-clamp and the upper channel acts as a seat clamp to any bicycle seat (or saddle). In some embodiments, the assembly is designed to install on any bicycle old or new without any modification required to either the bicycle or the device. In some embodiments, the device may be sold with a variety of seats (saddles) specifically designed to provide a low profile, and cover the device when the device is in the lowered position. In some embodiments, the upper and lower channels may be made of a variety of suitable materials including plastic, steel, aluminum and carbon fiber. In some embodiments, the arms of the assembly may be constructed from a variety of suitable materials including plastic, steel, aluminum and carbon fiber. In some embodiments, the device locks rigidly into multiple height positions within its height adjustment range. In some embodiments, the device comprises of an upper and lower channel connected by one pair of fixed arms and one pair of sliding arms arranged in an "X" pattern. In some embodiments, the lower channel remains stationary as the upper channel raises and lowers. In some embodiments, the arm axles may be replaced with other suitable fastening methods including rivets. In some embodiments, the sliding blocks may be made from any low friction suitable material such as UHMW or Acetal/Delrin, or may be replaced with a rolling type assembly which may utilize wheels. In some embodiments, the pin and hole locking assembly described herein may be replaced with many other suitable locking means. In some embodiments, the "X" formed by the upper and tower channels may be replaced with other suitable means of separating the channels to provide bicycle seat height adjustment.

An assembly is provided that is used to allow a bicycle to have seat height adjustment controlled by the rider while the bicycle is in motion. The seat height is adjustable to suit the needs of the operator. The device, or assembly, can provide up to 6 inches of adjustment range. The lower portion of the device has 2 rails sized and space the same as on connection rails of bicycle seats. This allows the unit to be mounted to different styles, sizes and types of seat -post/seat-clamp combination manufactured since 1960. The upper portion of the assembly is designed to accept a variety of bicycle seats manufactured today or past 50 years. A control cable exits from the bottom of the lower channel of the assembly and runs along the bicycle frame up to a small control, such as a lever or a pushbutton, installed nearby the handlebar grips. This allows easy seat height adjustment while riding without having to remove hands from the handlebar. Activating the control while body weight is lifted from the seat unlocks the seat and allows it to rise to the level desired. Once the desired seat height is achieved the control is released with body weight added, locking the seat in the desired position. If desired, the owner may set a memory position so that the next time the seat is raised it automatically steps at this height. To lower the seat the operator removes their weight from the seat, activates the control unlocking the seat and, while the control, remains depressed, adds body weight to lower the seat to the desired position. The existing seat clamp may be used to adjust the tilt of the seat or to adjust the seat post height when required to provide the best results from the assembly.

These and other modifications and variations to the present subject matter may be practiced by those of ordinary skill in the art, without departing from the spirit and scope of the present subject matter, which is more particularly set forth herein above and any appending claims. In addition, it should be understood the aspects of the various embodiments may be interchanged either in whole or in part. Furthermore, those of ordinary skill in the art will appreciate that the foregoing description is by way of example only, and is not intended to limit the present subject matter.

The invention claimed is:

1. An assembly for elevating and lowering bicycle seats, the assembly comprising:
   a horizontal lower channel which is attachable to at least one of an existing seat-post or seat-clamp of a bicycle, the lower channel having multiple locking holes therein;
   a horizontal upper channel which is attached to the lower channel by four arms, the horizontal upper channel is attachable to a bicycle seat;
   a lower sliding block that slidably engages the lower channel, the lower sliding block comprising a vertical steel locking pin, the locking pin being movable between an inserted position and a removed positioned within the respective locking holes of the lower channel to provide an adjustable seat height;
   an upper sliding block that slidably engages the upper channel;
   two arms of the four arms fixed to the lower and upper channel at opposite sides and connected by arm axles;
   two arms of the four arms attached to the lower and upper sliding blocks which are movable horizontally within the respective lower and upper channels,
   the four arms being connected at their midpoints at an "X" intersection by a common center axle forming a "X" shape which is flattenable and extendable vertically;
   a torsion spring which provides constant pressure on the arms "X" intersection for lifting the upper channel away from the lower channel;
   a flat spring for forcing the locking pin into the locking holes in the lower channel; and
   a cable with a pull lever mountable to a handlebar, the cable being attached to the flat spring such that when the pull lever is activated the cable pulls the flat spring up causing the locking pin to move up and out of one of the locking holes allowing the torsion spring to raise the upper channel and when the pull lever is released, the cable releases the flat spring which pushes the locking pin down into one of the locking holes of the lower channel.

2. The assembly according to claim 1, wherein the handlebar mounted pull lever is located nearby the handlebar grips to permit adjustment up or down of the bicycle seat to which the assembly is attached while the bicycle is in motion.

3. The assembly according to claim 1, wherein the upper and lower sliding blocks are opposed such that as both of the sliding blocks move inward to move the upper channel the upper channel and the seat to which it is attached moves upward and backward as the seat is raised.

4. The assembly according to claim 1, wherein the the upper and lower sliding bocks are not opposed wherein the upper channel remains in the same plain as the lower channel as the seat is raised and lowered.

5. The assembly according to claim 1, further comprising a memory plug for insertion into the locking holes of the lower channel allowing the seat rise to an operator's desired height.

6. The assembly according to claim 1, wherein the body weight is removed or added in order to raise or lower the bicycle seat.

7. The assembly according to claim 1, further comprising one or more rails secured to the lower channel that are attachable to the at least one of the existing seat-post or seat-clamp of the bicycle.

8. The assembly according to claim 1, further comprising a captivating plate secured to the upper channel for attaching the bicycle seat.

9. The assembly according to claim 1, wherein the upper channel is attached to a seat that provides a low profile to cover the assembly when the assembly is in the lowered position.

10. The assembly according to claim 1, wherein the upper and lower channels comprise at least one of plastic, steel, aluminum or carbon fiber.

11. The assembly according to claim 1, wherein the four arms comprise at least one of plastic, steel, aluminum or carbon fiber.

12. The assembly according to claim 1, wherein the assembly locks rigidly into multiple height positions within its height adjustment range.

13. The assembly according to claim 1, wherein the upper and lower channels connected by one pair of fixed arms and one pair of sliding arms arranged in an "X" pattern.

14. The assembly according to claim 1, wherein the lower channel remains stationary as the upper channel raises and lowers.

15. The assembly according to claim 1, wherein the sliding blocks comprises at least one of UHMW or acetal.

16. The assembly according to claim 1, wherein the lower and upper sliding blocks are respectively captivated to the upper and lower channels by ears on both sides of the respective lower and upper channels.

* * * * *